United States Patent
Eisen et al.

(10) Patent No.: US 8,540,410 B2
(45) Date of Patent: Sep. 24, 2013

(54) SUBMERGED PLANAR ILLUMINATION DEVICE

(76) Inventors: Leon Eisen, Ashdod (IL); Jacob Stern, Shoham (IL); Abraham Rotem, Petach Tikva (IL); Yoav Evron, Hod Hasharon (IL)

( * ) Notice: Subject to any disclaimer, the term of this patent is extended or adjusted under 35 U.S.C. 154(b) by 104 days.

(21) Appl. No.: 13/377,082

(22) PCT Filed: May 11, 2010

(86) PCT No.: PCT/IL2010/000375
§ 371 (c)(1),
(2), (4) Date: Dec. 8, 2011

(87) PCT Pub. No.: WO2010/143176
PCT Pub. Date: Dec. 16, 2010

(65) Prior Publication Data
US 2012/0087111 A1    Apr. 12, 2012

Related U.S. Application Data

(60) Provisional application No. 61/184,880, filed on Jun. 8, 2009.

(51) Int. Cl.
*F21V 7/04* (2006.01)
(52) U.S. Cl.
USPC .......... 362/602; 362/101; 362/267; 362/605; 362/617; 362/619; 385/901

(58) Field of Classification Search
USPC ............... 362/96, 101, 267, 562, 602, 604, 362/605, 617–620, 806, 812; 385/901
See application file for complete search history.

(56) References Cited

U.S. PATENT DOCUMENTS

| | | | |
|---|---|---|---|
| 5,799,124 A * | 8/1998 | Zorn et al. | 385/901 |
| 6,036,328 A | 3/2000 | Ohtsuki et al. | |
| 6,415,531 B1 | 7/2002 | Ohtsuki et al. | |
| 2003/0161137 A1 | 8/2003 | Schach et al. | |
| 2006/0268537 A1 | 11/2006 | Kurihara et al. | |
| 2007/0057626 A1 | 3/2007 | Kurihara et al. | |
| 2008/0291689 A1 | 11/2008 | Ajiki et al. | |
| 2009/0034292 A1 | 2/2009 | Pokrovskiy et al. | |

\* cited by examiner

*Primary Examiner* — Stephen F Husar
(74) *Attorney, Agent, or Firm* — Browdy and Neimark, PLLC

(57) ABSTRACT

A submerged planar illumination device for providing specified, substantially uniform distribution of light in liquid from one or few light sources such as LED. The device comprises a light guiding plate having an entrance edge to which the LEDs are fixed, a collimator for redirecting the light and forming substrate light which is coupled to a light guiding plate having at least one light extracting surface. Light extracting surface are optionally on both large surfaces of the light guiding plate. Each light extracting surface is covered with a pattern of light extracting and scattering elements capable of collecting, scattering and extracting light propagating in the light guiding plate into the liquid ambient medium in which the device is submerged. A cover, sealed to the entrance edge of the light guiding plate, protects the light emitting element from the liquid ambient medium.

21 Claims, 4 Drawing Sheets

SUBMERGED PLANAR ILLUMINATION DEVICE

Applicant hereby claims foreign priority under 35 U.S.C §119 from PCT application number PCT/IL2010/000375 entitled "Submerged Planar Illumination Device", filed May 11, 2010, which in turn claims priority of the U.S. provisional application No. 61/184,880 filed Jun. 8, 2009, the disclosures of which are herein incorporated by reference in their entirety.

FIELD OF THE INVENTION

The present invention relates generally to planar light sources, to be submerged in liquid, having light extracting and scattering elements on its surfaces.

SUMMARY OF THE INVENTION

The present invention generally discloses a planar light sources, backlights and illuminators having light extracting and scattering elements on its surfaces and, more specifically, to illumination device submerged in liquid to be used in medical, biological and chemical applications for photosynthesis oxygen or hydrogen generation, carbon-dioxide assimilation, pH shift, Nitrogen fixation, Oxygen radical formation, photosynthetic induces electron transport, photosynthetic redox poising, biological clocks manipulation, fluorescence, chemical radical reduction light sensitive chemical relations initiation, growth of photosynthetic organisms like plant, algae and etc, and for decoration as well.

It is hence one object of the invention to disclose a planar illumination device comprising: a light guiding plate, at least one light emitting element generating light, and a cover. The planar illumination device is submerged in liquid. The light guiding plate is adapted for guiding light to light extracting surface. The light emitting element is embedded into the light guiding plate and adapted for input light generation. The cover is made of PEEK or other medium and adapted for protecting light emitting element from the liquid and liquid vapor.

Another object of the invention is to disclose a light guiding plate of circular, oval, triangular, quadrate or other shape, made of high refractive index glass or plastic medium and comprising at least one light extracting surface, at least one collimator and at least one light entrance edge. The light extracting surface is adapted for light extraction out of the light guiding plate. The light extracting surface is further adapted for scattering substrate component of light inside the light guiding plate. The substrate component of light continues propagating inside the light guiding plate. The collimator is preferably covered by Aluminum, Silver or Gold or other high reflective coating which is configured for substrate light component reflection inside the light guide. The collimator is further adapted for substrate light component reorientation inside the light guiding plate. The entrance edge is adapted for input light coupling inside the light guiding plate. The edge is further adapted for substrate light component reflection inside the light guiding plate.

Further object of the invention is to disclose at least one light extracting surface having a pattern of light extracting and scattering elements thereon. The light extracting and scattering elements are adapted for collecting, scattering and extracting light propagating inside the light guiding plate. The pattern of light extracting and scattering elements covers varying fractions of any elementary area of light extracting surface in a non-uniform pattern configuration that is substantially a two-dimensional, non-monotonic irregular function that can be described by the polynomial equations. The uniqueness of the pattern of light extracting and scattering elements is dictated by the refractive index of the liquid ambient medium and refractive index of light guiding plate submerged therein.

Further object of the invention is to disclose light extracting and scattering element. The light extracting and scattering element can be a hole or a bump of spherical, pyramidal, triangular or other shape. The shape of the light extracting and scattering element is dictated by the refractive index of the liquid ambient medium and refractive index of light guiding plate submerged therein.

Further object of the invention is to disclose a collimator having a trapezoid, parabolic or other straight or curved shape. The shape of the collimator is adapted for substrate light reorientation and concentration within angles larger than angle of total internal reflection. The reoriented substrate light component continues to propagate inside the light guiding plate with the propagation angle equal or larger than angle of total internal reflection.

Another object of the invention is a coupling configuration of light emitting element in the light guiding plate. At least one light emitting element, which is preferably a LED chip, is embedded into a notch in the edge of the light guiding plate and fixed there, preferably by using adhesive.

Another object of the invention is to provide a submerged planar illumination device for providing substantially uniform distribution of the scattered and extracted light into liquid from one or few light sources such as LED. The device comprises a light guiding plate having an entrance edge with a notch, or a plurality of notches, in which the LED(s) are embedded and fixed, a collimator for reorientation of the light which is subsequently coupled into a light guiding plate having at least one light extracting surface. Light extracting surface are optionally on both large surfaces of the light guiding plate. Each light extracting surface is covered with a pattern of light extracting and scattering elements capable of collecting, scattering and extracting the propagating in the light guiding plate light into liquid ambient medium in which the device is submerged. A cover, sealed to entrance edge and, optionally, to collimator surfaces of the light guiding plate, protects the light emitting element(s) from the liquid ambient medium.

Another object of the invention is to provide a Submerged Planar Illumination device comprising: a light guiding plate having at least one light extracting surface; at least one collimator; and at least one entrance edge; at least one light emitting element generating light, each said light emitting elements disposed so as to couple a respective input light from a light emitting element into a corresponding edge, forming a corresponding substrate light component which propagates through the collimator by reflection; the substrate light component exits from the collimator forming a corresponding substrate light component which propagates through the light guiding plate by total internal reflection; a cover made of PEEK or other an appropriate material is used for protecting the light emitting element from the liquid and said liquid vapor; a Parylene coating sealing the light emitting element from the liquid and said liquid vapor, wherein at least one said light extracting surface being submerged into the liquid ambient medium has a pattern of light extracting and scattering elements collecting, scattering and extracting light from all said light emitting elements simultaneously; said a pattern of light extracting and scattering elements distributed on at least one said light extracting surface covers a varying fractions of any elementary area thereon in a non-uniform pattern configuration that is substantially a two-dimensional, non-monotonic irregular function of a point within said elementary area in a coordinate system originated at the middle of the said light extracting surface.

In some embodiments a portion of each of said substrate light components is coupled out of said light guiding plate, all such portions adding up to an extracted light.

In some embodiments a portion of each of said substrate light components is further scattered into said light guiding plate, forming a said substrate light components.

In some embodiments said substrate light components propagate through said light guiding plate by total internal reflection.

In some embodiments a portion of each of coupled out said substrate light components is coupled into said liquid ambient medium, all such portions adding up to an illumination light.

In some embodiments the edge of said light guiding plate, which is not an entrance edge is a reflective edge, is free of said light extracting and scattering elements and is covered by reflective coating.

In some embodiments at least some of surface of said light guiding plate which is free of said light extracting and scattering elements is covered by a reflective coating.

In some embodiments the collimator surface is covered by a reflective coating.

In some embodiments the collimator has a parabolic concentrator shape of a specified aspect ratio.

In some embodiments the density of the pattern of light extracting and scattering elements varies over each of said light extracting surfaces.

In some embodiments the density varies so as to affect any specified spatial and angular distribution of said extracted light over at least one said light extracting surface.

In some embodiments each light extracting and scattering element is a small hole.

In some embodiments each light extracting and scattering element is a bump.

In some embodiments the light extracting and scattering elements are formed with constant or varying size with constant or varying distances between centers of adjacent said light extracting and scattering elements.

In some embodiments said variation of the density pattern of extracting elements over any said light extracting surface is a function in global coordinate system.

In some embodiments said variation of the density pattern of extracting elements over any light extracting surface is a function in local coordinate system originated at a point on corresponding said light extracting surface.

In some embodiments said specified spatial and angular distribution of said extracted light is uniform.

In some embodiments the specified spatial and angular distribution of the extracted light is of any specified pattern and structure.

It is yet another aspect of the invention to provide a method of illumination comprising the steps of: submerging a planar illumination device into liquid ambient medium, said planar illumination device comprises: a light guiding plate; at least one light emitting element; and a cover, sealed to said entrance edge of light guiding plate, protecting said at least one light emitting element from said liquid ambient medium, generating input light by at least one light emitting element; coupling said generated light to an entrance edge of a light collimator; reorienting said input light by said collimator forming substrate light having propagation geometry within total internal reflection angles dictated by both the light guiding plate material and ambient medium; coupling said substrate light to a light guiding plate having at least one light extracting surface covered with having a pattern of light extracting and scattering elements, propagating said substrate light along said light guiding plate while collecting, scattering and extracting portions from said substrate light component by said extracting and scattering elements forming extracted light propagating into said liquid ambient medium, wherein the pattern of light extracting and scattering elements distributed on said at least one light extracting surface in a non-uniform pattern configuration that is substantially a two-dimensional, non-monotonic irregular function.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF THE INVENTION

Figure 1A:
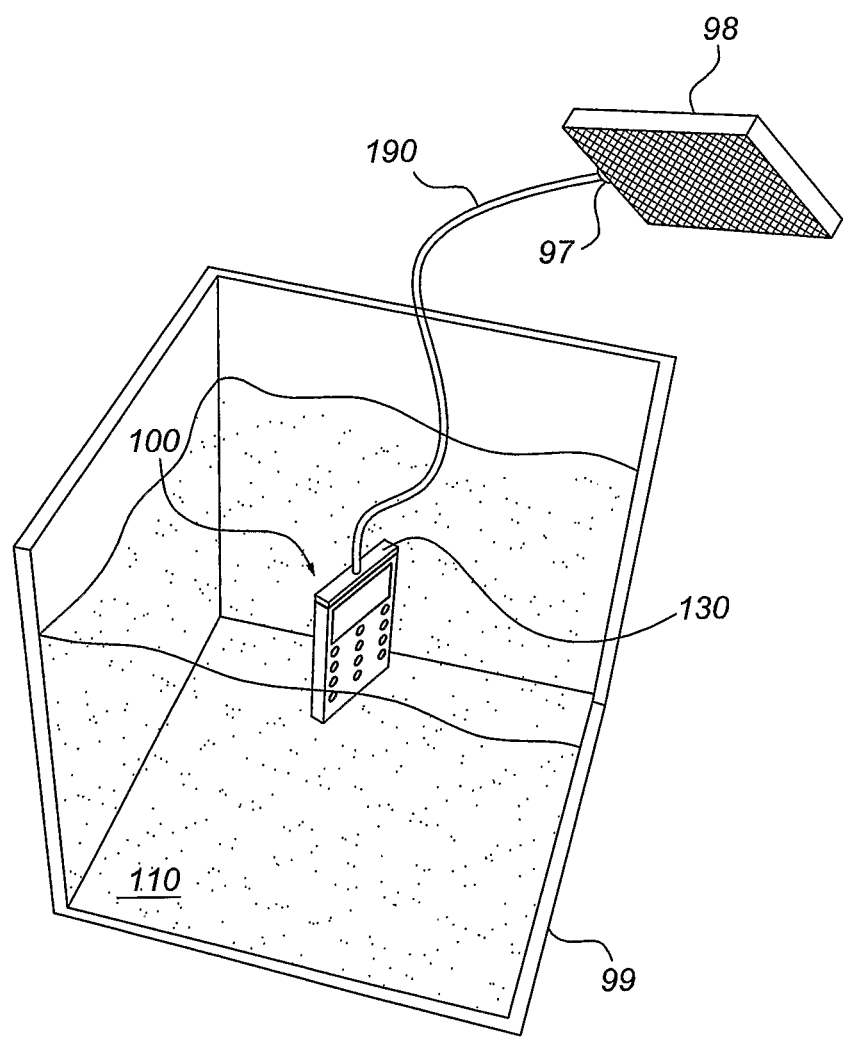
FIG. 1a schematically depicts the use of a planar illumination device according to an exemplary embodiment of the current invention.

The following description is provided with reference to the accompanying drawings, so as to enable any person skilled in the art to make use of said invention and sets forth the best modes contemplated by the inventor of carrying out this invention.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

The terms "comprises", "comprising", "includes", "including", and "having" together with their conjugates mean "including but not limited to".

The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements were omitted from some of the drawing.

Referring now to FIG. 1a, there is illustrated therein a three-dimensional exploded view of a planar illumination device 100 submerged in a container 99 holding the liquid ambient medium 110 according to the present invention. The power supply 98 is connected to a planar illumination device 100 using cord 190 and plug 97.

Figure 1B:
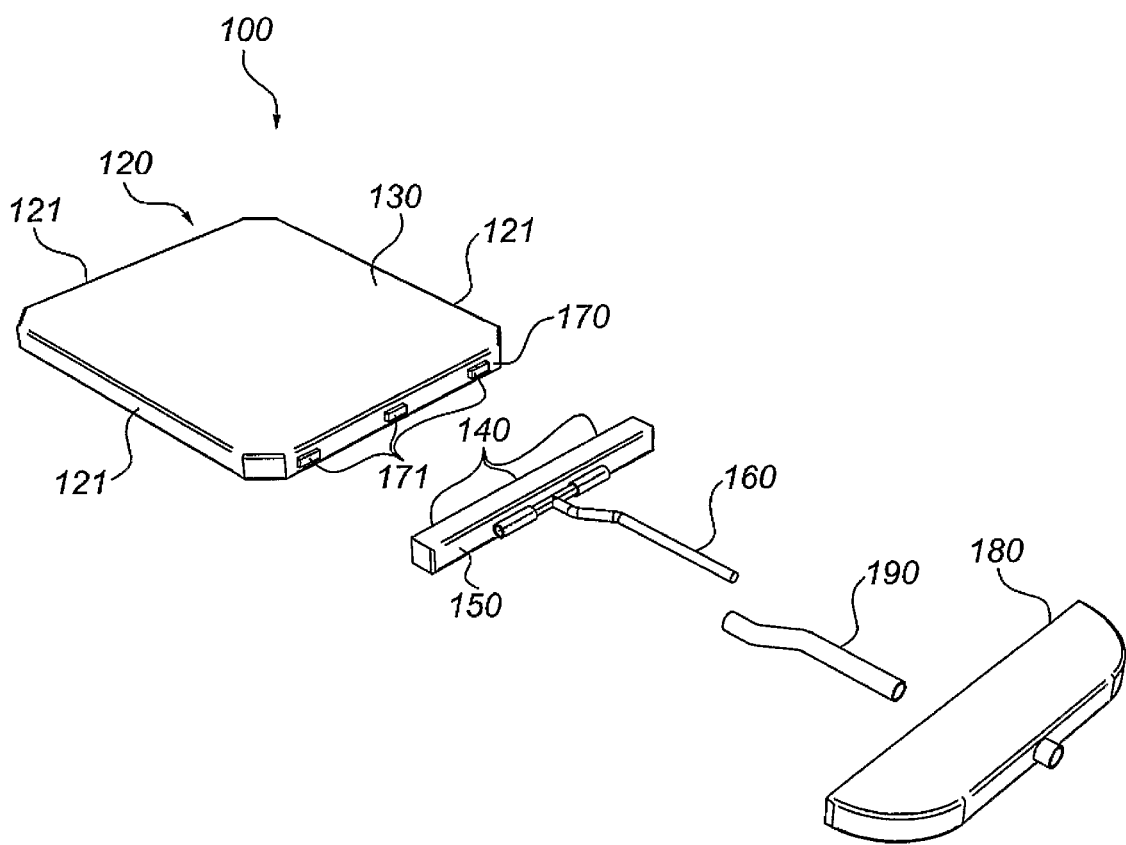
FIG. 1b is an isometric 3D exploded view of the planar illumination device according to an exemplary embodiment of the current invention.

Referring now to FIG. 1b, there is illustrated therein a three-dimensional exploded view of a planar illumination device 100 submerged in the liquid ambient medium 110 according to the present invention. In the planar illumination device 100 a light guiding plate 120 which made of glass or plastic medium of high refractive index such as SF11 or Polyurethane, includes light extracting surface 130 through which the light is extracted from the light guiding plate 120. In some embodiments, the light is extracted from the light guiding plate 120 has essentially uniform spatial distribution. High refractive index material is used in order to have appropriate difference between refractive index of the liquid ambient medium 110 and refractive index of the light guiding plate 120 such that it enables uniform light extraction or, optionally, light extraction of specified pattern and structure from the light guiding plate 120. Preferably, some or all edges 121 of the light guiding plate 120 are coated by the reflective layer to reflect substrate light components back into the light guiding plate 120.

The planar illumination device 100 further includes at least one, and optionally a plurality of light emitting element 140, which may be an encapsulated LED or bare LED chip, arranged on the PCB 150 connected with electrical wires 160 and disposed along the entrance edge 170 or embedded into optional edge notch (or notches) 171 in the entrance edge 170 of the light guiding plate 120 so that an emitted light is efficiently coupled inside the light guiding plate 120. The planar illumination device 100 also includes a protection cover 180 and protection pipe 190 which prevents the PCB 150 and light emitting element 140 from the penetration of the ambient medium 110 in liquid or vapor phase.

Figure 2A:
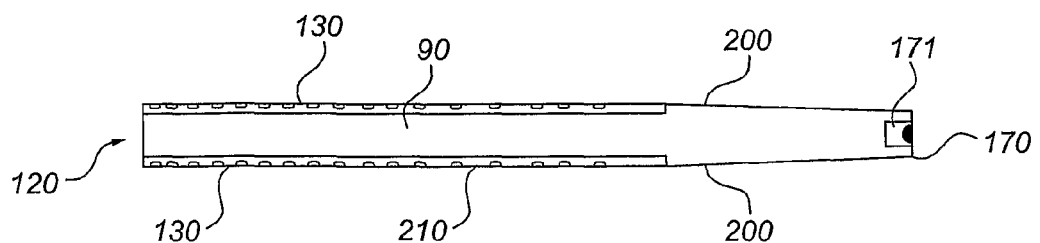
FIG. 2a is a side view of light guiding plate geometry according to an exemplary embodiment of the current invention.
Figure 2B:
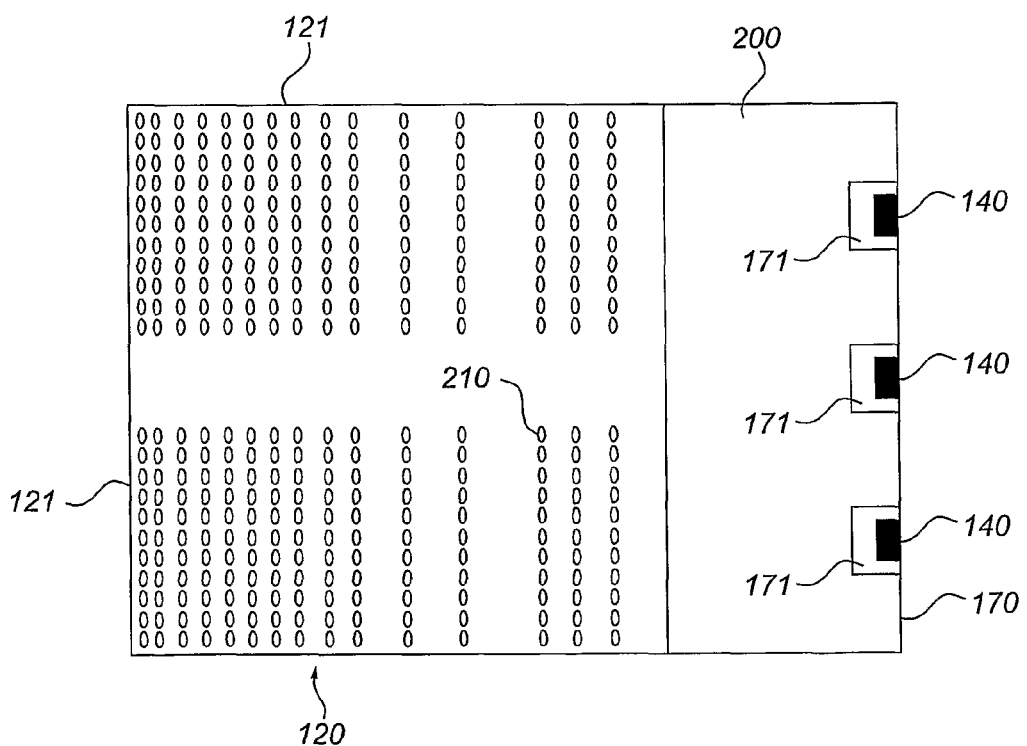
FIG. 2b is a top view of light guiding plate geometry with the pattern of light extracting and scattering elements according to an exemplary embodiment of the current invention.

Referring now to FIGS. 2a and 2b, schematically illustrating a side view and a top view respectively of the light guiding plate 120 according to exemplary embodiment of the present invention. The light guiding plate 120 further includes a trapezoid reflective light collimator 200 which reorients substrate light components within the propagation angles which are bigger than total internal reflection angle corresponding to refractive indexes of light guiding plate and ambient mediums 110. The reoriented substrate light component continues to propagate inside the light guiding plate bouncing at the light extracting surface 130 and reflecting edges 121. The surfaces of the light collimator 200 and reflective edges 121 are preferably coated by the reflective medium such as gold, silver or aluminum.

The light guiding plate 120 further includes light extracting and scattering elements 210 which may be holes or bumps of spherical, pyramidal, triangular or other shapes. The shape of the light extracting and scattering element is dictated by the refractive index of the liquid ambient medium and refractive index of light guiding plate submerged therein. The light extracting and scattering elements 210 are arranged along the light extracting surfaces 130 in such manner that causes essentially uniform light extraction or, optionally, light extraction of specified pattern and structure from the light guiding plate 120 into the liquid ambient medium 110. To efficiently and uniformly extract the light from the light extracting surfaces 130, the pattern of light extracting and scattering elements covering varying fractions of any elementary area of light extracting surface 130 is calculated using mathematical optimization procedures taking into account the refractive indexes of liquid ambient medium and light guiding plate. As a result, the pattern of light extracting and scattering elements is substantially a two-dimensional, non-monotonic irregular function that can be described by the polynomial equations.

Figure 3:
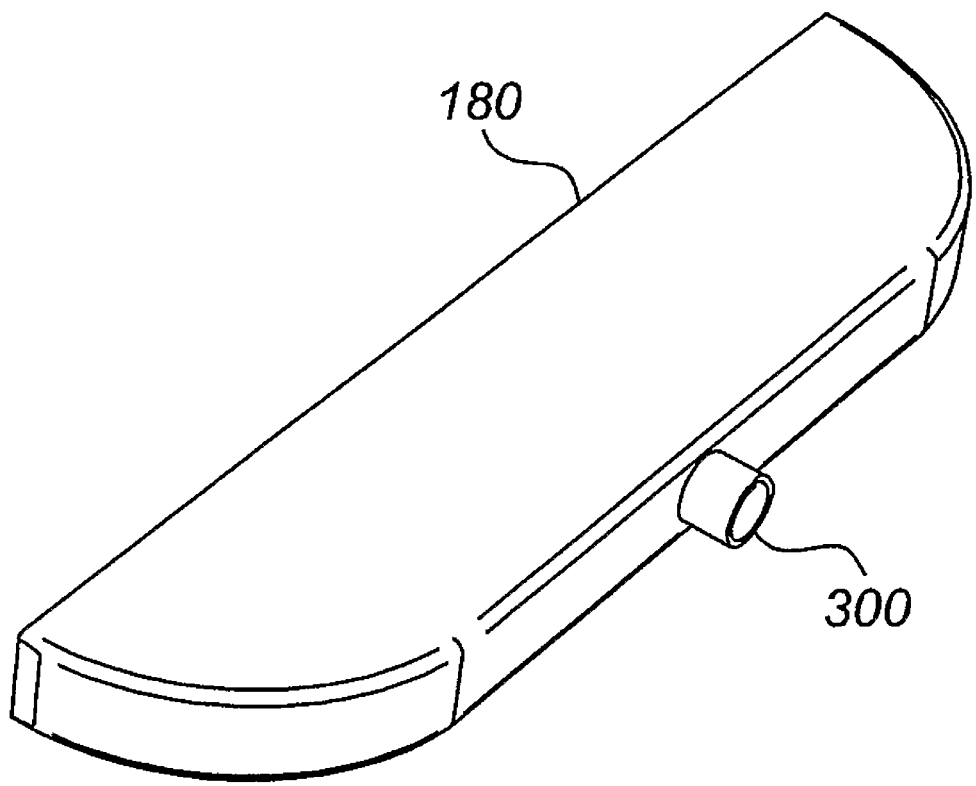
FIG. 3 is an isometric 3D view of typical cover according to an exemplary embodiment of the current invention.

Referring now to FIG. 3, there is illustrated therein a three-dimensional view of exemplary protection cover 180 which is preferably made of polyetheretherketone (PEEK) or other material with strong liquid and vapor protection properties. Cover 180 seals the PCB 150 and light guiding plate collimator 200 from liquid and vapor penetration. The hole 300, leads out the electrical wires 160 from the PCB 150 and is sealed to protection pipe 190. Preferably an additional layer protective material such as Parylene material is added at the cover—light guiding plate interface for the extra protection. It is possible to use epoxy adhesive instead of cover. In this case, the Parylene material preferably covers the entire epoxy area.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A submerged planar illumination device comprising:
   a light guiding plate having:
   at least one light extracting surface;
   at least one collimator; and
   an entrance edge;
   at least one light emitting element generating light, wherein each of said at least one light emitting element is disposed so as to couple input light from said light emitting element into said entrance edge, wherein said input light forming a corresponding substrate light component which propagates through said collimator by reflection, wherein said substrate light component exits from said collimator and propagates through said light guiding plate by total internal reflection; and
   a cover, sealed to said entrance edge of the light guiding plate, protecting said at least one light emitting element from liquid ambient medium,
   wherein said submerged planar illumination device is capable of being submerged in liquid ambient medium such that said at least one light extracting surface is being submerged into said liquid ambient medium, said light extracting surface is having a pattern of light extracting and scattering elements capable of collecting, scattering and extracting light from said substrate light component forming extracted light propagating into said liquid ambient medium, wherein the pattern of light extracting and scattering elements distributed on said at least one light extracting surface in a non-uniform pattern configuration that is substantially a two-dimensional, non-monotonic irregular function.

2. The submerged planar illumination device according to claim 1 and further comprising a coating made of material such as Parylene, sealing said light emitting element from liquid and vapor.

3. The submerged planar illumination device according to claim 1, wherein a portion of said substrate light components is further scattered into said light guiding plate, forming scattered substrate light components.

4. The submerged planar illumination device according to claim 3, wherein said scattered substrate light components propagate through light guiding plate by total internal reflection.

5. The submerged planar illumination device according to claim 1, wherein a difference between refractive index of said light guiding plate and a refractive index of said liquid ambient medium is larger than 0.3.

6. The submerged planar illumination device according to claim 5, wherein said difference between refractive index of said light guiding plate and refractive index of said liquid ambient medium is larger than 0.35.

7. The submerged planar illumination device according to claim 5, wherein said difference between refractive index of said light guiding plate and refractive index of said liquid ambient medium is between 0.3 and 0.35.

8. The submerged planar illumination device according to claim 1, wherein at least a portion of the edge of said light guiding plate which is not used for coupling input light from said light emitting element is covered by a reflective coating.

9. The submerged planar illumination device according to claim 1, wherein at least a portion of the surface of said light guiding plate which is free of said light extracting and scattering elements is covered by a reflective coating.

10. The submerged planar illumination device according to claim 1, wherein said collimator is covered by a reflective coating.

11. The submerged planar illumination device according to claim 1, wherein said collimator has a parabolic concentrator shape of a specified aspect ratio.

12. The submerged planar illumination device according to claim 1, wherein the density of said pattern of light extracting and scattering elements varies over each of said at least one light extracting surface.

13. The submerged planar illumination device according to claim 12, wherein said density of said pattern of light extracting and scattering elements varies so as to affect a specified spatial and angular distribution of said extracted light over at least one of said light extracting surface.

14. The submerged planar illumination device according to claim 1, wherein each of said light extracting and scattering element is a small hole.

15. The submerged planar illumination device according to claim 1, wherein each of said light extracting and scattering element is a bump.

16. The submerged planar illumination device according to claim 1, wherein said light extracting and scattering elements are formed with constant or varying size, and with constant or varying distances between centers of adjacent said at least one light extracting and scattering elements.

17. The submerged planar illumination device according to claim 1, wherein variation of the density pattern of said extracting and scattering elements over any of said at least one light extracting surface is a function in global coordinate system.

18. The submerged planar illumination device according to claim 17, wherein said variation of the density pattern of extracting elements over any of said light extracting surface is a function in local coordinate system originated at a point on corresponding said light extracting surface.

19. The submerged planar illumination device according to claim 1, wherein spatial and angular distribution of said extracted light is substantially uniform.

20. The submerged planar illumination device according to claim 1, wherein spatial and angular distribution of said extracted light is of specified pattern and structure.

21. A method of illumination comprising the steps of:
    submerging a planar illumination device into liquid ambient medium, said planar illumination device comprises:
    a light guiding plate;
    at least one light emitting element; and
    a cover, sealed to said entrance edge of light guiding plate, protecting said at least one light emitting element from said liquid ambient medium,
    generating input light by at least one light emitting element;
    coupling said generated light to an entrance edge of a light collimator;
    reorienting said input light by said collimator forming substrate light having propagation geometry within total internal reflection angles dictated by both the light guiding plate material and ambient medium;
    coupling said substrate light to a light guiding plate having at least one light extracting surface covered with having a pattern of light extracting and scattering elements,
    propagating said substrate light along said light guiding plate while collecting, scattering and extracting portions from said substrate light component by said extracting and scattering elements forming extracted light propagating into said liquid ambient medium, wherein the pattern of light extracting and scattering elements distributed on said at least one light extracting surface in a non-uniform pattern configuration that is substantially a two-dimensional, non-monotonic irregular function.

\* \* \* \* \*